United States Patent [19]

Kawai et al.

[11] Patent Number: 5,029,234
[45] Date of Patent: Jul. 2, 1991

[54] SYSTEM AND METHOD FOR COMMUNICATING A VEHICLE WITH A CALLING PARTY

[75] Inventors: Akio Kawai; Yasuhiro Okada; Masaaki Taniguchi; Hiroshi Ueno; Masami Kiyoto, all of Kanagawa, Japan

[73] Assignee: Nissan Motor Company, Limited, Japan

[21] Appl. No.: 184,254

[22] Filed: Apr. 21, 1988

[30] Foreign Application Priority Data

May 15, 1987 [JP] Japan .............................. 62-72389[U]

[51] Int. Cl.$^5$ .......................... H04B 7/26; H04B 1/44
[52] U.S. Cl. ....................................... 455/58; 455/54; 455/78; 379/62
[58] Field of Search ........................ 455/58, 54, 53, 56, 455/33, 34, 78, 79, 89; 379/58, 59, 60, 62

[56] References Cited

U.S. PATENT DOCUMENTS

| | | | |
|---|---|---|---|
| 4,517,561 | 5/1985 | Burke et al. ....................... | 455/58 X |
| 4,628,537 | 12/1986 | Shimakata et al. .................... | 455/58 |
| 4,783,844 | 11/1988 | Higashiyama et al. ............... | 455/34 |
| 4,821,310 | 4/1989 | Lynk, Jr. et al. ..................... | 455/54 |

FOREIGN PATENT DOCUMENTS

| | | |
|---|---|---|
| 50-75706 | 6/1975 | Japan . |
| 58-161100 | 9/1983 | Japan . |
| 60-100715 | 4/1985 | Japan . |
| 61-164614 | 10/1986 | Japan . |

Primary Examiner—Douglas W. Olms
Assistant Examiner—Ralph Smith
Attorney, Agent, or Firm—Lowe, Price, LeBlanc & Becker

[57] ABSTRACT

A system and method for communicating a vehicle with a calling party are disclosed in which even when a communication circuit is interrupted during a data communication of the system with the calling party such as a base station due to a worse circuit condition, the calling from the system to the calling party is carried out without operation of a switch for activating the system to start calling so that the communication with the calling party is restarted. The communication data includes a vehicle identification code (ID information) and/or instantaneous position of the vehicle.

12 Claims, 3 Drawing Sheets

SYSTEM AND METHOD FOR COMMUNICATING A VEHICLE WITH A CALLING PARTY

BACKGROUND OF THE INVENTION (1) Field of the Invention

The present invention relates to a system and method for communicating a vehicle with a calling party, e.g., a base station, particularily but not exclusively suitable for informing the base station of a location of the vehicle in which the system is mounted.

(2) Background of the Art

Recently, many automotive vehicles have adopted, so called, (hand-free) automotive telephones as vehicle communication systems.

Such kinds of vehicular communication systems are exemplified by Japanese Patent Application First (Nonexamined) Publications sho 50-75706 published on June 21, 1976, sho 58-161100 published on Sept. 24, 1983, and sho 60-100715 published on June 4, 1985.

Furthermore, a Japanese Utility Model Application No. sho 61-164614 filed on Oct. 27, 1986 exemplifies one of the other vehicular communication systems which informs the base station of the instantanous location of the vehicle in which the communication system is mounted.

In the above-identified Japanese Utility Model Application, when a corresponding switch installed on a transceiver is turned on, a positional information and identification number allocated to the vehicle are transmitted to the base station, the positional information being derived from means, installed on the vehicle, for detecting a position of the vehicle.

The vehicular communication system disclosed in the above-identified Japanese Utility Model Application has a feature capable of informing the position of the vehicle in which the system is mounted to the base station according to its necessity.

However, when in the automotive telephones, the communications are carried out during the movement of the vehicle on roads, a circuit interruption occurs when the vehicle passes through tunnels or underpasses or otherwise when a circuit condition is worse. In this case, a redialing becomes necessary.

In addition, in the previously proposed vehicular communication system, a communication circuit for the automotive vehicles is used to inform the vehicular position to the base station. Therefore, when the circuit interruption occurs, the operator (usually the vehicle driver) confirms the occurrence of the circuit interruption and a manual operation is needed to cause the system to be activated. This follows that a speedy activation cannot be carried out in case of emergency and, in worst cases, the vehicular position cannot be informed to the base station in the case when no reoperation is possible.

SUMMARY OF THE INVENTION

It is, therefore, an object of the invention to provide a system for communicating the vehicle with the calling party such as the base station which can recover the circuit without reactivation such as redialing when the circuit interruption occurs in a midway through the communication.

The above-described object can be achieved by providing a system for communicating a moving object with a calling party, comprising: (a) first means operable by an operator for activating a communication of the system mounted in the object with the calling party; (b) second means for controlling the calling from the system to the calling party; (c) third means for communicating the system with the calling party when a response to the calling from the calling party is present; (d) fourth means for modulating and demodulating a communication data and controlling a calling signal; (e) fifth means for transmitting waves of the communication data and the calling signal to the calling party; (f) sixth means for detecting whether a communication circuit is interrupted at least before the completion of transmission of the communication data from the system to the calling party; and (g) seventh means for enabling the operation of the second means without operation of the first means when the sixth means detects the circuit interruption.

The above-described object can be achieved by providing a system for communicating a vehicle with a base station, comprising: (a) first means operable by an operator for activating a communication of the system mounted in the vehicle with the base station; (b) second means for controlling the calling from the system to the base station; (c) third means for communicating the system with the base station when a response to the calling from the base station is received; (d) fourth means for modulating and demodulating a communication data and controlling a calling signal; (e) fifth means for transmitting radio frequency waves of the communication data and the calling signal to the base station; (f) sixth means for detecting whether a communication circuit is interrupted before the completion of transmission of the communication data from the system to the base station and before confirmation of receipt of acknowledgement to the communication data from the base station; (g) seventh means for enabling the operation of the second means when the sixth means detects the circuit interruption.

The above-described object can be achieved by providing a method for communicating a vehicle with a calling party, comprising the steps of: (a) detecting whether first means for activating a communication of a vehicular communication system with the calling party is operated; (b) controlling the calling from the communication system to the calling party; (c) communicating the vehicular communication system with the calling party when a response to the calling from the calling party is present; (d) modulating and demodulating a communication data and controlling a calling signal; (f) transmitting radio frequency waves of the communication data and the calling signal to the calling party; (g) detecting whether a communication circuit is interrupted before the completion of transmission of communication data from the system to the calling party or before the detection of response signal to the communication data of receipt acknowledgement from the calling party; and (h) enabling the operation carried out in the steps (b) to (f) when detecting the circuit interruption in the step (g).

DETAILED DESCRIPTION OF THE PREFERRED EMBODIMENT

Reference will hereinafter be made to the drawings in order to facilitate understanding of the present invention.

Figure 1:
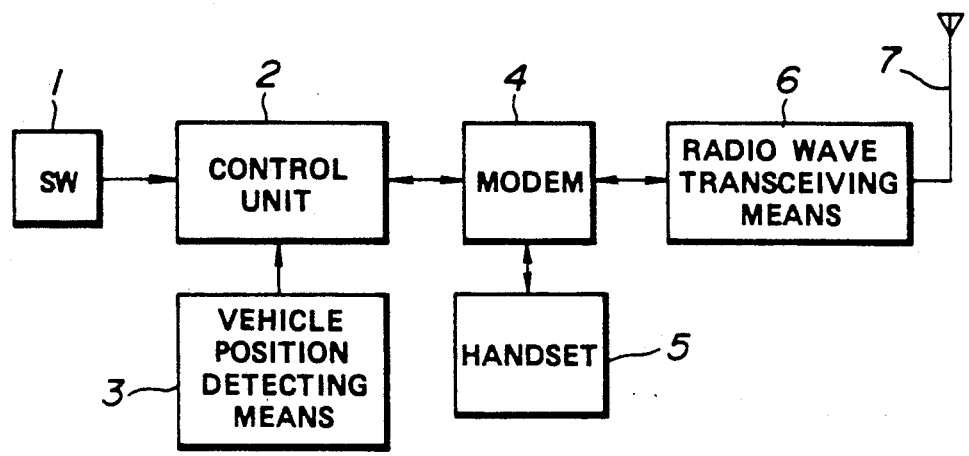
FIG. 1 is a circuit block diagram of a system for communicating a vehicle with a base station in a preferred embodiment according to the present invention.

FIG. 1 shows a block diagram of vehicular communicating system in a preferred embodiment according to the present invention.

In FIG. 1, communication activating means 1 constituted by push button switches by means of which an operator (vehicle driver) operates to inform a base station of a present position of the vehicle.

It is noted that the communication activating means may be constituted by a specific dial of an automotive vehicle telephone set to be described later.

A control unit 2 is installed which is activated in response to a signal derived from the communication activating means 1.

The control unit 2 receives a vehicular position information data from means 3 for detecting a vehicular position constituted by a geomagnetic sensor and distance sensor. The vehicular position detecting means 3 is exemplified by a U.S. patent application Ser. Nos. 015,999, filed on Feb. 18, 1987 and 836,624 filed on Mar. 5, 1986, and a U.S. Pat. No. 4,442,609 issued on Apr. 17, 1984, the disclosures of the above-identified U.S. Patent and Patent Application being hereby incorporated by reference.

An output signal to a modem 4 to be described below is derived from the control unit 2. In addition, an input signal to the control unit 2 is derived from the modem (Modulator-and-Demodulator) 4 for the automotive telephone in which a Network Control Unit (NCU) is incorporated.

A handset 5 for the automotive telephone is connected to the modem 4. In addition, means 6 for transmitting and receiving radio waves constituted by a mobile transceiver of the automotive telephone set. An antenna 7 usually installed on a rear outside portion of the vehicle for the automotive telephone is connected to the radio wave transmitting and receiving means 6.

Figure 2:
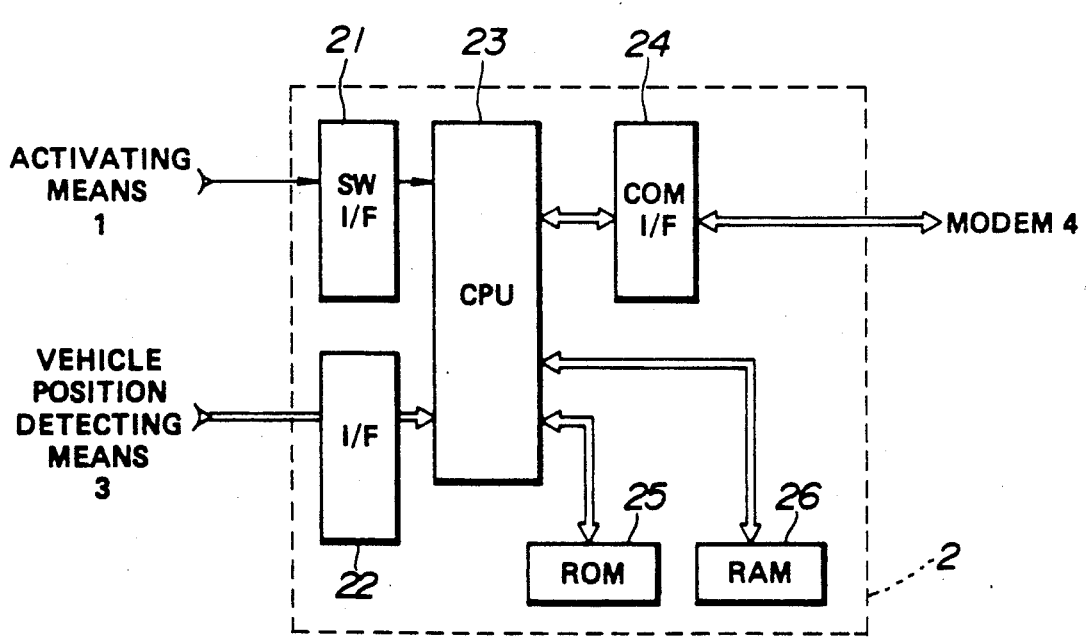
FIG. 2 is a detailed circuit block diagram of a control unit shown in FIG. 1.

FIG. 2 shows a circuit block diagram of the control unit 2.

In FIG. 2, two interfaces 21, 22 are provided in the control unit 2 for interfacing the activation signal derived from the communication activating means 1 and the vehicular position data signal derived from the vehicular position detecting means 3 with a CPU (Central Processing Unit) 23. A communication interface 24 installed between the modem 4 and CPU 23. In addition, a ROM (Read Only Memory) 25 is provided for storing an identification data (ID information) for the vehicle and system program (OS) for the CPU 23. A RAM (Random Access Memory) for temporarily storing data on the vehicular position.

Figure 3:
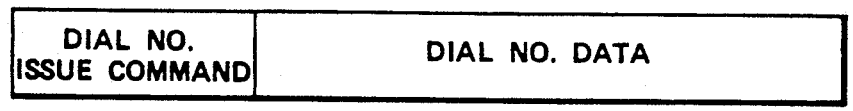
FIGS. 3(a) and 3(b) are explanatory views of a data format.
Figure 3:
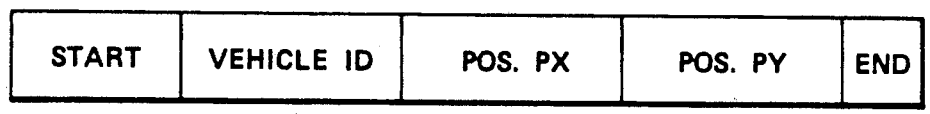

FIGS. 3(a) and 3(b) show the data format.

FIG. 3(a) indicates a dial number data to be transmitted to the modem 4 from the control unit 2 and FIG. 3(b) indicates a vehicular position data to be transmitted from the control unit 2 to the modem 4 and to the base station (not shown) via the radio wave transceiving means 6.

Figure 4:
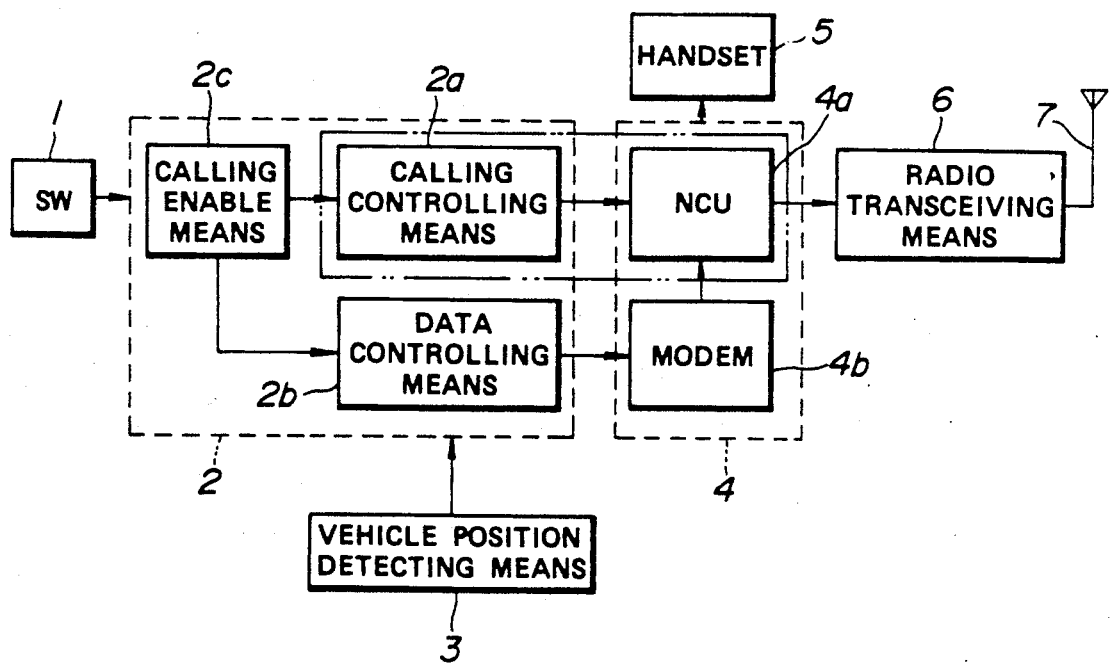
FIG. 4 is a circuit block diagram for explaining the contents of control.

FIG. 4 shows detailed functional construction of the control unit 2 and modem 4 shown in FIG. 1.

The control unit 2 includes calling controlling means 2a, data controlling means 2b, and calling control enabling means 2c.

When a signal derived from communication activating means 1 is transmitted to the calling control enabling means 2c, the calling control enabling means 2c enables the calling controlling means 2a to be activated.

Then, with the calling controlling means 2c activated, the control unit 2 calls the base station via the NCU 4a, radio wave tranceiving means 6, and automotive telephone antenna 7.

Then, the transmission data constituted by the vehicular position inputted from the vehicular position detecting means 3 and the vehicular ID information are transmitted from data controlling means 2b to the base station via a modem portion 4b of the modem 4, NCU 4a, radio wave transceiving means 6, and automotive telephone antenna 7. It is noted that during the connection of the communication circuit to the base station the handset 5 enables the communications with the base station.

Next, an operation of the preferred embodiment when the vehicle passes through a tunnel or underpass during the transmission of the data or when the communication circuit interruption occurs due to failure in the circuit state will be described with reference to FIG. 5.

It is noted that the vehicular position detecting means 3 is always operating and the CPU 23 reads the vehicular position data P (X,Y) via the interface 24 and stores it into the RAM 26.

Figure 5:
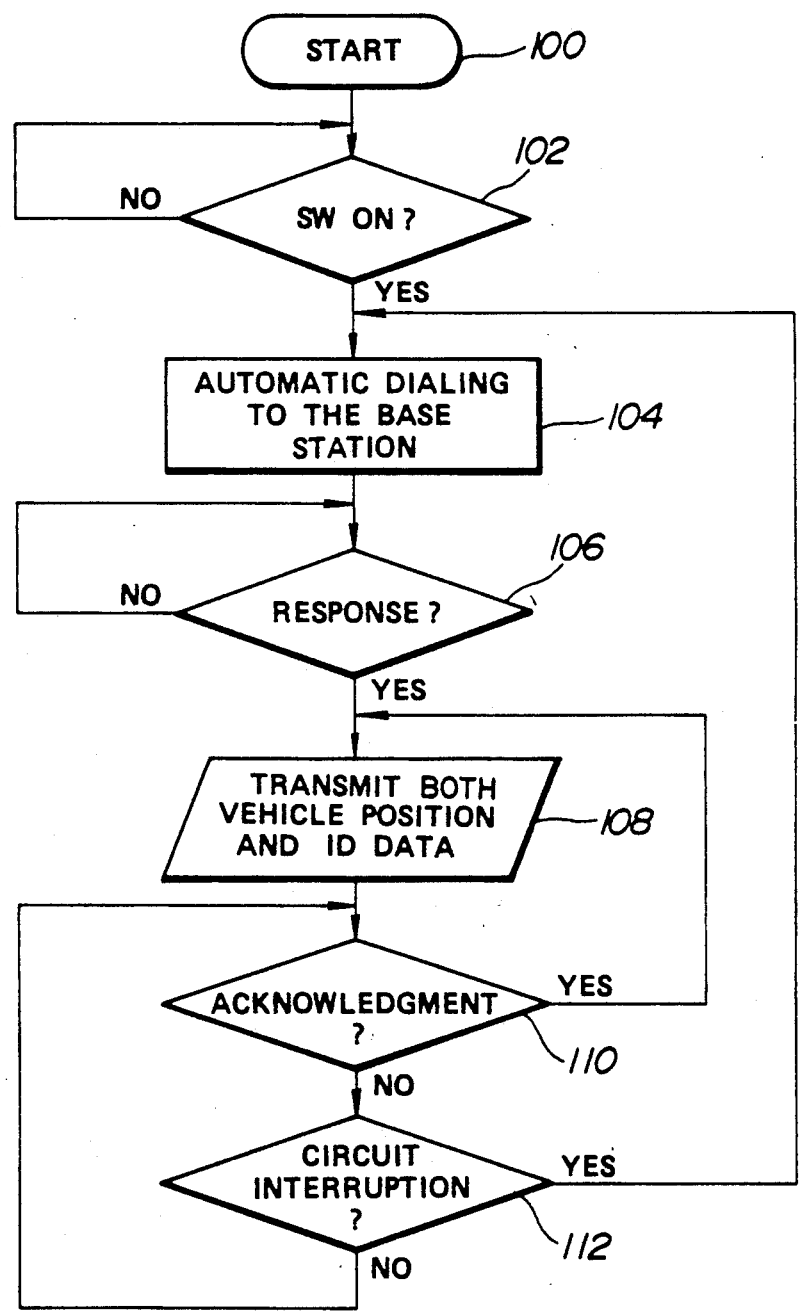
FIG. 5 is a processing flowchart for explaining a processing procedure executed in a CPU shown in FIG. 2.

In FIG. 5, the program is started when a switch of the communication activating means 1 is turned on in a step 100.

In a step 102, the control unit 2 determines whether the switch has been turned on. Upon confirmation that the switch has been turned on, the control unit 2 encodes and supplies a dial number of a telephone of the base station in accordance with a specific sequence to the modem 4 via the communication interface 24.

The modem 4 modulates the input dial number into a specified dial signal and supplies it to the radio wave transceiving means 6 and starts the calling to a calling subscriber, i.e., the base station, in a step 104.

If the communication circuit is connected and the control unit 2 determines a presence or absence of a response from the base station in a step 106. If the response is present in the step 106, the CPU 23 reads the latest information of the position of the vehicle from the position detecting means 3. The CPU 23 supplies the above-described latest information on position and the vehicular ID information previously stored in the ROM 25 via the communication interface 24. The modem 4 modulates the input data and supplies the modulated data to the radio wave tranceiving means 6. The modulated data is transmitted to the base station via the automotive telephone antenna 7. The above-described sequence is carried out in a step 108.

In a step 110, the CPU 23 determines whether there is a positive acknowledgement for the transmitted data from the base station. If the acknowledgement is present, the routine returns to the step 108, in which the system transmits a new vehicular position information and party data from the vehicle (Transmit both vehicle position and ID data).

In a case where the communication with the base station is interrupted when, e.g., the vehicle passes through the tunnel in a midway through the communication of data, the acknowledgement from the base station is not received in the step 110. The CPU 23 monitors a circuit state via the interface 24 and determines whether the circuit is broken in a step 112. When the CPU 23 determines that the circuit is broken in a step 112, the routine returns to the step 104 in which the calling to the base station is again started. That is to say, the calling control enabling means 2c of the controlling means 2 starts.

When the CPU 23 determines that the circuit is connected (No in the step 112), the routine returns to the step 110 in which the CPU 23 again determines the presence or absence of the acknowledgement.

In the preferred embodiment, when the acknowledgement from the base station is not received due to the pass of the vehicle through the tunnel in the midway through the transmission of data to the base station, or when the communication circuit is interrupted due to a worse circuit condition during the communication, the CPU 23 determines whether the communication circuit has broken. When the circuit has been broken, the system in the preferred embodiment can call the base station without press of the switch in the communication activating means 1 by the operator (usually vehicle driver). Therefore, no special manipulation by the operator is needed.

It is noted that although in the preferred embodiment, the vehicular communication system which can inform the calling subscriber, i.e., the base station of the vehicular position is described, the vehicular position detecting means 3 and data controlling means 2b for controlling such data from the vehicular position detecting means 3 may be omitted if the system serves merely to communicate with a calling party.

As described hereinabove, the vehicular communication system according to the present invention can recover the circuit automatically without the reconnection of the system to the circuit. Consequently, the operator can relieve from such a troublesome operation that upon confirmation of the incapability of communication with the calling party the communication activating means needs to again be operated.

It will fully be appreciated from those skilled in the art that the foregoing description is made in terms of the preferred embodiment and various changes and modifications may be made without departing from the scope of the present invention which is to be defined by the appended claims.

What is claimed is:

1. A mobile communications system mounted in a mobile platform for providing communications between a mobile user and a calling party over a radio communications circuit, comprising:
   (a) first means operable by an operator for activating said mobile communications system to initiate establishment of said radio communications circuit with the calling party;
   (b) second means for initiating a calling sequence from the mobile system to the calling party in response to said first means;
   (c) third means for establishing said radio communications circuit with calling party when a response to the calling party is present;
   (d) fourth means for modulating and demodulating a communication data and controlling a calling signal;
   (e) fifth means for transmitting a radio signal including the modulated communication data and calling signal to the calling party;
   (f) sixth means for detecting an interruption of said radio communications circuit with the calling party prior to the mobile communications system receiving a response signal to the communication data from the mobile communications system indicative of receipt of acknowledgement from the calling party; and
   (g) seventh means for automatically initiating operation of the second means without operation of the first means when the sixth means detects the radio communications circuit interruption.

2. A system as set fourth in claim 1, further comprising eighth means for detecting the instantaneous position of the mobile environment and outputting a position data signal indicative thereof wherein said communication data includes said position data and ninth means for controlling the communication data and supplying the data to the fourth means in response to the output signal from the first means.

3. A system as set forth in claim 1, wherein the communication data includes identification data of said platform.

4. A system as set forth in claim 1, wherein the first means comprises a switch.

5. A system as set forth in claim 1, wherein the first means comprises a specific dial of an automotive telephone.

6. A system as set forth in claim 1, wherein the fourth means comprises a modem including a network control unit (NCU).

7. A system as set forth in claim 1, wherein the radio communications circuit interruption is likely to occur when the mobile platform passes through an area through which the radio signal does not readily propagate.

8. A system as set forth in claim 7, wherein the area includes tunnels or underways.

9. A system as set forth in claim 1, wherein the circuit interruption occurs under a worse condition of the communication circuit.

10. A system for providing communications between a vehicle and a base station, comprising:
   (a) first means operable by an operator for activating a communication of a mobile communications system mounted in the vehicle with the base station;
   (b) second means responsive to said first means for initiating a calling sequence from the system to the base station;
   (c) third means for establishing said radio communications circuit between the mobile communications system and the base station in response to an acknowledgement signal received from the base station by said mobile communications system;
   (d) fourth means for modulating and demodulating communication data and controlling a calling signal;
   (e) fifth means for transmitting radio frequency waves of the communication data and calling signal to the base station over said radio communications circuit;
   (f) sixth means for detecting an interruption of said radio communications circuit prior to completion of transmission of the communication data from the mobile communication system to the base station and prior to confirmation of receipt of acknowledgement to the communication data from the base station; and (g) seventh means for operating the second means to automatically establish said radio communications circuit in response to detection of an interruption of said radio communications circuit by the sixth means.

11. A method for providing communications between a vehicle having mounted therein a vehicular communication system and a calling party, comprising the steps of:

(a) detecting an operation of a first means for activating a communication mode of said vehicular communication system to initiate establishment of a radio communications circuit with the calling part;

(b) initiating a calling signal from the vehicular communications system to the calling party;

(c) establishing said radio communications circuit between the vehicular communication system and the calling party when a response to a calling signal from the calling party is received by said vehicular communication system;

(d) modulating and demodulating a communication data and controlling a calling signal;

(e) transmitting a radio frequency signal including said communication data and calling signal to the calling party;

(f) detecting an interruption of said radio communications circuit prior to completion of transmission of communication data from the vehicular communication system to the calling party and prior to detection of a response signal from the calling party to the communication data acknowledging receipt thereof; and (g) initiating an operation in accordance with steps (b) to (e) in response to detecting the radio communications circuit interruption in step (f).

12. In a mobile telephone system for establishing two-way radio communications between (i) a vehicle having installed therein a mobile telephone set and (ii) a base station, said mobile telephone set comprising:

(a) call initiation means manually operable by an operator of said mobile telephone set for initiating establishment of a two-way radio communications circuit between said mobile telephone set and said base station;

(b) control means responsive to said call initiation means for transmitting a service request signal thereby initiating establishment of said two-way radio communications circuit between said mobile telephone set and said base station;

(c) position determination means for determining a position of said vehicle and transmitting over said radio communications circuit data corresponding to said position; and (d) carrier monitoring means for monitoring a signal received from said base station and, in response to an interruption of said base station signal prior to transmission of said position data, supplying a call reinitiation signal to said control means whereby said control means automatically transmits a service request signal to reestablish said radio communications circuit.

* * * * *